Figure 1:
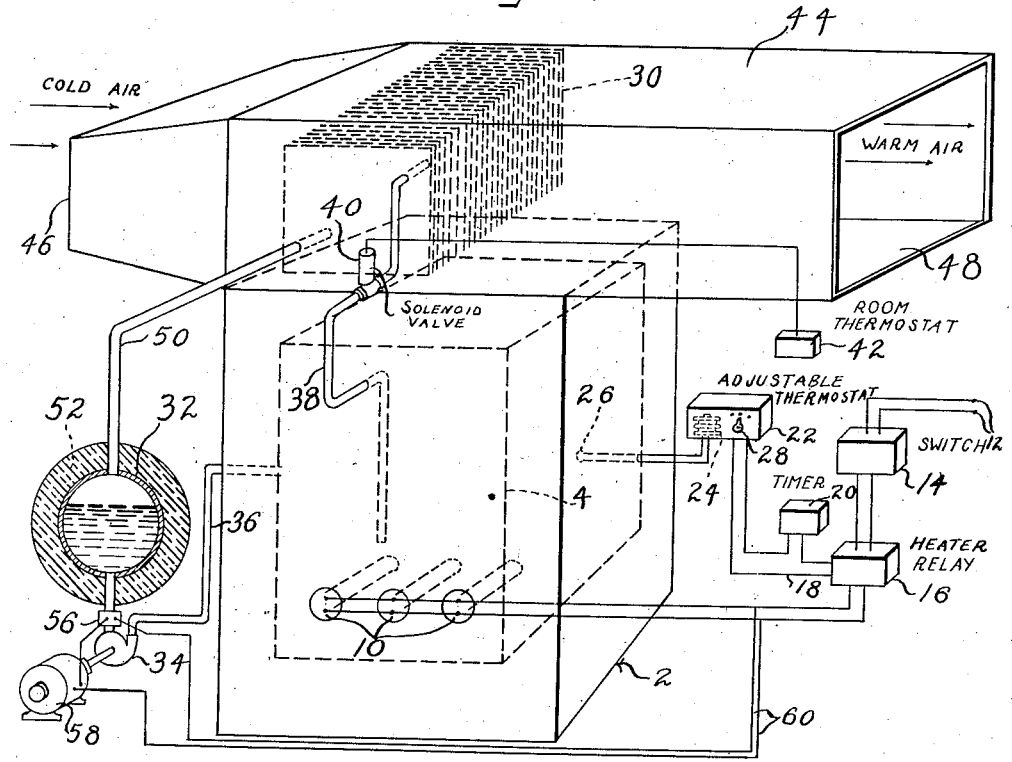

Jan. 13, 1948.  R. B. MARSHALL  2,434,575
HEATING SYSTEM
Filed May 8, 1946

Inventor
RICHARD B. MARSHALL.

Patented Jan. 13, 1948

2,434,575

UNITED STATES PATENT OFFICE 2,434,575

HEATING SYSTEM

Richard B. Marshall, Detroit, Mich., assignor to Electromaster, Inc., Detroit, Mich., a corporation of Michigan Application May 8, 1946, Serial No. 668,270

10 Claims. (Cl. 219—39)

This invention relates to a heating system and particularly to an improved method and apparatus for heating homes or buildings of similar size by electricity.

The use of electricity for domestic heating purposes has been widely advocated due to the cleanliness and susceptibility of control of electrical heating apparatus, but to date, large-scale heating of homes and other small buildings has been a practical impossibility due to the fact that all of the available electrical generating equipment is already required to supply the normal peak power load incurred by present-day uses of electricity independent of home heating. Accordingly, the wide scale application of electrical heating to homes would immediately exceed the power capacity of available generating equipment and thus the power companies are placed in the undesirable position of having to refuse to supply the additional power requirements for domestic electric heating, despite the obvious attraction of the unity power factor load inherent in electric heating.

In accordance with this invention, an improved method and apparatus for heating by electricity is provided which draws electric power only during certain predetermined periods of each day and hence the power demand periods of the heating apparatus may be timed to coincide with the off peak power periods of the conventional power demands upon the generating system. For example, a heating system in accordance with this invention may be adjusted to draw power only between the hours of 10:00 p. m. and 7:00 a. m., which is a well recognized "off peak" power period in all electrical generating systems. There is a large amount of generating capacity available for use during such off peak power periods and a heating system embodying this invention provides a very desirable unity power factor load for the available generating capacity throughout the entire off peak power period.

The heating system contemplated by this invention comprises an insulated boiler element defining a fluid storage chamber in which a fixed quantity of high boiling point, heat storing fluid is disposed. While several types of fluids of these properties are known in the art, this invention preferably utilizes a fluid known as diphenyl oxide or mixtures thereof, such as that described in U. S. Patent No. 1,882,809, issued October 18, 1932, to John J. Grebe. The total heat input to the high temperature, heat storing fluid during the energization period of the electric heater provided for heating such fluid, is proportioned to exceed the expected heat demands of the room area to be heated during the entire daily period, or in other words, over the entire twenty-four hours elapsing between the beginning of the successive off peak power periods.

In my copending applications, Serial Nos. 668,269 and 668,271, filed on even date herewith, there are described and claimed various forms of heating apparatus operating according to the aforedescribed principles. This invention provides an improved heating method and apparatus by which heat is stored over an entire daily period by the electrical heating of a fixed quantity of high temperature, heat storing fluid during off peak power periods and the transfer of heat from the heat storing fluid to the room heating apparatus is accomplished by withdrawing successive small portions of the hot, electrically heated fluid from the main body of hot fluid in response to the heat demands of the room area to be heated. The withdrawn portions of hot fluid are utilized to energize heat transfer apparatus which in turn heats the heating medium applied to the room area. This arrangement is in contrast to those of my above identified copending applications wherein the electrically heated fluid remains in a fixed physical location but heat is withdrawn from such fluid by heat transfer apparatus disposed in heat conducting relation to the entire body of the electrically heated fluid.

Accordingly, it is an object of this invention to provide an improved method and apparatus for electrically heating homes and other buildings of corresponding size.

A further object of this invention is to provide an improved method and apparatus for electric heating which is operable only during off peak power periods of the generating system to which it is connected, thereby assuring that the peak power generating capacity of such generating system need not be increased to accommodate the additional load represented by the electrical heating system.

A still further object of this invention is to provide an improved heating system wherein a fixed quantity of high boiling point, heat storing liquid is heated to a sufficient degree during off peak power periods to insure that the heat stored therein will exceed the expected heat demands of the room area to be heated over an entire daily period.

Another object of this invention is to provide an improved heating apparatus for heating and storing of a fixed quantity of high boiling point, heat storing liquid and providing for the circulation of the heated liquid through a heat transfer apparatus to transfer the heat stored therein to a room heating medium in response to the heat demands of the room area to be heated.

The specific nature of the invention as well as other objects and advantages thereof will become apparent to those skilled in the art from the detailed description of the annexed sheet of drawings which, by way of preferred example only, illustrates two specific embodiments of the invention.

Figure 2:
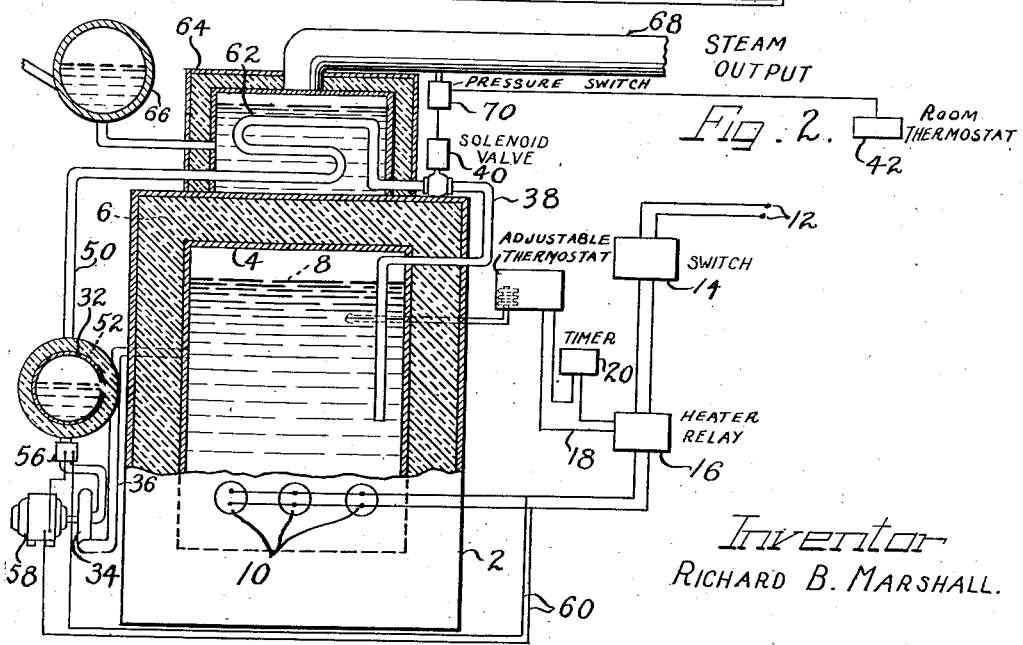

In the drawings:

Figure 1 is a schematic perspective view of an electrical heating system embodying this invention which provides for the heating of a room area by a stream of heated air; and Figure 2 is an elevational view, partly in section, of a modified electrical heating system embodying this invention wherein the room area to be heated is heated by steam.

As shown on the drawings:

In accordance with this invention, a boiler 2 of any convenient shape is provided which defines a fluid heating and storing chamber 4 therein. The chamber 4 is surrounded by suitable insulation 6 to insure that the heat losses from such chamber will be minimized, and particularly that the reduction in temperature of the fluid contents of said chamber 4 due to heat loss through the walls of the boiler 2 will be substantially negligible over a twenty-four hour period. A fixed quantity of high boiling point, heat storing liquid 8 is inserted in the chamber 4 of boiler 2.

To heat the fluid 8, a plurality of conventional electrical heating elements 10 are provided which are energized from main power terminals 12 through a line switch 14 and the contacts (not shown) of a heater relay 16. The operation of heater relay 16 is controlled by a low voltage control circuit 18 which includes the contacts (not shown) of a timer unit 20 and an adjustable thermostat unit 22. Timer unit 20 may comprise any one of several well-known forms of cyclically operating, timing switches, and the timer unit 20 is adjusted so as to close its control contacts only during a predetermined portion of the cyclic period which corresponds to the occurrence of off peak power periods of the generating system. For purposes of example, it may be assumed that timer unit 20 closes its control contacts once each day, throughout the period of 10:00 p. m. to 7:00 a. m.

Adjustable thermostat unit 22 may likewise comprise any one of several well-known forms which will open its contacts upon the fluid 8 in the chamber 4 of the boiler obtaining a predetermined temperature or pressure. For example, adjustable thermostat 22 may include a switch actuating bellows 24 which is in turn energized by the expansion of a suitable fluid disposed in a bulb 26 located in the interior of the chamber 4. Preferably an adjustment of thermostat 22 is provided to control the temperature at which it will close its control contacts over a substantial range. Such adjusting mechanism may be manually operated by a knob 28. As will be seen, the adjustable thermostat in effect may be operated as a "weather selector."

From the foregoing description, it will be apparent that the fluid 8 in boiler 2 is electrically heated only during off peak power periods of the generating system and, furthermore, the extent of heating of the fluid 8 is controlled by the particular setting of the adjustable thermostat 22. Accordingly, the total heat input to fluid 8 may be selected in accordance with the amount of heat output which it is expected that the boiler 2 will be required to supply during the next twenty-four hour period.

While there are several different types of materials that may be utilized as the electrically heated fluid 8, this invention preferably contemplates the use of a diphenyl oxide fluid or mixtures thereof in view of the markedly superior heat properties of this fluid. Commercially available forms of diphenyl oxide mixtures have a boiling point of 500° F. at atmospheric pressure and at the elevated temperature of 725° F. produce a vapor pressure on the order of 110 pounds per square inch gauge. In addition, the specific heat of diphenyl oxide fluid is quite large and more nearly approaches that of water than other known forms of high boiling point, low vapor pressure fluid. The low vapor pressure of diphenyl oxide fluid at temperatures above its boiling point are of particular value in the described construction wherein the fluid 8 is electrically heated in a substantially closed chamber. In a domestic heating system, the loss of the electrically heated fluid and the attendant difficulties of replacement of such fluid in the heating system must obviously be avoided and accordingly the low vapor pressure properties of diphenyl oxide fluid which permits the heating of such fluid to high temperatures without requiring an elaborate arrangement of pressure relief valves involving continuous small losses of the fluid, has obvious advantages. In the construction embodied in this invention, when the fluid 8 comprises diphenyl oxide fluid, it is preferably heated by the electrical heater 10 to a selected point in the range from 500° to 700° F. as determined by the particular setting of adjustable thermostat 22.

To effect the transfer of heat from the electrically heated fluid 8 to the room area to be heated, a closed, heat dissipating fluid circulation system is provided, comprising in the modification of Figure 1, an air stream heat exchanger 30, a condensate collector 32, a condensate return pump 34, and a condensate return conduit 36. A suitable conduit 38 is provided communicating between fluid storage chamber 4 and the heat exchanger 30 to supply hot fluid 8 to such heat exchanger. A solenoid operated valve 40 of any conventional type is provided to control the flow of hot fluid from chamber 4 into heat exchanger 30 in accordance with the heat demands of the room area being heated, as determined by a room thermostat 42. Thus room thermostat 42 permits the admission of successive portions of the hot fluid 8 stored in fluid storage chamber 4 to the heat exchanger 30 in accordance with the heat demands of the room area in which room thermostat 42 is located. Heat exchanger 30 is disposed within an air supply conduit 44 having an inlet end 46 through which cold air is supplied and an outlet end 48 from which the heated air is supplied to the room area to be heated.

After circulating through the air heat exchanger 30, the fluid 8 which is thus cooled and probably liquefied, is withdrawn from heat exchanger 30 to a condensate collector 32 through a suitable pipe 50. Condensate collector 32 comprises merely a storage tank and is preferably enclosed by insulating material 52 to minimize heat losses from the collected condensate therein.

A pipe connects condensate collector 32 with the condensate return pump 34 through a pressure controlled switch 56. Pump 34 is driven by a suitable electric motor 58 which is energized through conductors 60 in parallel with the electrical heater elements 10 and in series with the contacts (not shown) of pressure switch 56. It is therefore apparent that the pump 34 will be operated to return the collected cold condensate fluid 54 back to the main body of hot fluid in the fluid storing chamber 4 only when the heater elements 10 are also energized. Such arrangement insures against the lowering of the temperature of the high temperature fluid 8 stored within chamber 4 throughout the heat dissipating period. Furthermore, pressure switch 56 insures that motor 58 is energized only so long as there is condensate in collector 32.

In operation of the described heating system, the timer unit 20 will, of course, be initially adjusted to limit the energization of the electric heaters 10 to the off peak power period of the particular generating system from which the heating system is supplied. The user of the system need only adjust the setting of adjustable thermostat 22, by operation of adjusting knob 28, in accordance with the severity of weather conditions expected during the next twenty-four hour period. During mild weather, the heat input to the electrically heated fluid 8, as represented by the maximum temperature to which such fluid is heated, need not be as great as the heat input during severe cold weather, as the demand for heat from the room area being heated will be substantially reduced.

In any event, the heating system is safe and foolproof, inasmuch as the adjustable thermostat 22, even when set for its highest temperature, will effectively interrupt the heating of the electrically heated liquid fluid 8 at a temperature of the fluid corresponding to a safe value of vapor pressure. The system is preferably designed by correlation of the amount of electrically heated fluid 8, the maximum temperature thereof, and the duration of the off peak power period during which the electrical heaters are energized, so that the total input to the electrically heated fluid 8 in any one energization period will be in excess of the expected heat demands of the room area for the most severe cold weather conditions. Proper correlation of the above mentioned variable design factors can also result in a design wherein the total current drawn by the electrical heaters may in certain instances be maintained at a value less than the maximum current capacity of existing wiring in the house being heated.

The described heating system obviously operates by withdrawal of successive quantities of the electrically heated, high temperature fluid 8 into the air heat exchanger 30 as controlled by the heat demands of room thermostat 42. It should be particularly noted that there is no substantial heat loss from the body of electrically heated fluid 8 remaining in the chamber 4 and accordingly, the hot fluid 8 will be supplied to the heat exchanger 30 at substantially the same elevated temperature throughout the heat supplying period when the electrical heaters 10 are deenergized. This arrangement greatly facilitates the design of the air stream heat exchanger 30 inasmuch as the temperature differential between the hot fluid 8 and the cold air passing through the heat exchanger 30 will be substantially constant. Accordingly, the design of the air stream heat exchanger 30 may readily be accomplished to yield a temperature of the heated air of proper value for supply to the room area to be heated.

In the modification of this invention shown in Figure 2, all elements of the heating system are identical with those of Figure 1 except for the substitution of a steam type heat transfer apparatus for effecting the transfer of heat from the heated fluid 8 to the room area to be heated. Accordingly the output side of solenoid valve 40 is connected to the coils of a heat exchanger 62 and the cold fluid 8 is conducted from heat exchanger 62 to condensate collector 32 by a pipe 50.

Heat exchanger 62 is disposed in heat transfer relationship in a steam boiler 64. Water is supplied to steam boiler 64 from a suitable tank 66 and the steam generated in boiler 64 is conducted to suitable radiators (not shown) in the room area to be heated by the steam pipe 68. The control circuit for the solenoid valve 40 is modified to include the contacts (not shown) of a pressure switch 70 in series with the contacts (not shown) of the room thermostat 42. Pressure switch 70 is a conventional type which will close its contacts upon the steam pressure in the output pipe 68 falling below a predetermined safe value. Accordingly solenoid valve 40 will be operated to admit hot fluid 8 to heat exchanger 62 only in response to the joint action of room thermostat 42 and pressure switch 70.

The operation of the modification of Figure 2 is identical to that already described in connection with Figure 1 with the exception that steam is generated in boiler 64 by heat transfer from the hot fluid 8 and supplied to the room area to be heated through output pipe 68. As in the modification of Figure 1, the condensate return pump 34 is operated by its motor 58 only during the energization period of the electrical heaters 10. Thus the cold condensate 54 collected in condensate collector 32 is effectively prevented from returning to the hot fluid 8 in the fluid storage chamber 4 except during the energization period of the electrical heater 10.

It is therefore apparent that the described invention provides an improved method and apparatus for electrical heating of homes or similar building structures, and has the particular advantage of permitting such electrical heating to be accomplished during normally off peak power periods of the generating system. Hence domestic electric heating can be immediately available to the public without requiring an increase in available peak power generating capacity. Furthermore the apparatus embodying this invention has the desirable feature of facilitating an efficient design of the heat exchanger for transferring heat from the electrically heated fluid to the room heating medium inasmuch as the electrically heated fluid is always supplied to the heat exchanger at substantially the same elevated temperature.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. An electrical heating system comprising a heat insulated boiler defining a fluid storing chamber, a heat dissipating fluid circulation system supplied by said boiler and including a heat exchanger connected to receive hot fluid in vapor form from said boiler, a condensate collector, and a return conduit to said fluid storing chamber, valve means disposed in said circulation system intermediate said fluid storing chamber and said heat exchanger, means controlling the return of condensate to said fluid storing chamber to return such only during predetermined periods, room heating means heated by said heat exchanger, means responsive to room temperature for controlling said valve means, a fixed quantity of high boiling point, heat storing fluid disposed in said fluid circulation system, and electric heater means in said boiler for heating said fluid.

2. An electrical heating system comprising a heat insulated boiler defining a fluid storing chamber, a heat dissipating fluid circulation system supplied by said boiler and including a heat exchanger connected to receive hot fluid from said boiler, a collector connected to receive cold fluid from said heat exchanger, and a return conduit to said fluid storing chamber, valve means disposed in said circulation system intermediate said fluid storing chamber and said heat exchanger, room heating means heated by said heat exchanger, means responsive to room temperature for controlling said valve means, a fixed quantity of high boiling point, heat storing fluid disposed in said fluid circulation system, electric heater means in said boiler for heating said fluid, electric circuit means for energizing said heater means including a cyclically operating timing switch permitting energization of said heater means only during a predetermined portion of the cyclic period of said timing switch, the heat input to said fluid during said predetermined portion of the cyclic period being proportioned to exceed the expected heat demands of said room heating means over the entire cyclic period, and means controlling the return of cold fluid from said collector to said chamber to return such only during predetermined periods.

3. An electrical heating system comprising a heat insulated boiler defining a fluid storing chamber, a heat dissipating fluid circulation system supplied by said boiler and including a heat exchanger connected to receive hot fluid from said boiler, a condensate collector, and a return conduit to said fluid storing chamber, valve means imposed in said circulation system intermediate said fluid storing chamber and said heat exchanger, room heating means heated by said heat exchanger, means responsive to room temperature for controlling said valve means, a fixed quantity of high boiling point heat storing fluid disposed in said fluid circulation system, electric heater means in said boiler for heating said fluid, electric circuit means for energizing said heater means including a cyclically operating timing switch permitting energization of said heater means only during a predetermined portion of the cyclic period of said timing switch, means for interrupting energization of said heating means when said fluid reaches a predetermined temperature, the heat input to said fluid during said predetermined portion of the cyclic period being proportioned to exceed the expected heat demand of said room heating means over the entire cyclic period, and means for returning cold fluid from said condensate collector only when said electric heaters are energized.

4. An electrical heating system comprising a heat insulated boiler defining a fluid storing chamber, a heat dissipating fluid circulation system supplied by said boiler and including a heat exchanger connected to receive hot fluid from said boiler, a condensate collector, and a return conduit to said fluid storing chamber, valve means disposed in said circulation system intermediate said fluid storing chamber and said heat exchanger, room heating means heated by said heat exchanger, means responsive to room temperature for controlling said valve means, and a fixed quantity of diphenyl oxide fluid disposed in said fluid circulation system, electric heater means in said boiler for heating said diphenyl oxide fluid, electric circuit means for energizing said heater means including a cyclically operating timing switch permitting energization of said heater means only during a predetermined portion of the cyclic period of said timing switch, the heat input to said diphenyl oxide fluid during said predetermined portion of the cyclic period being proportioned to exceed the expected heat demands of said room heating means over the entire cyclic period.

5. An electrical heating system comprising a heat insulated boiler defining a fluid storing chamber, a heat dissipating fluid circulation system supplied by said boiler and including a heat exchanger connected to receive hot fluid from said boiler, a condensate collector, and a return conduit to said fluid storing chamber, valve means disposed in said circulation system intermediate said fluid storing chamber and said heat exchanger, room heating means heated by said heat exchanger, means responsive to room temperature for controlling said valve means, a fixed quantity of diphenyl oxide fluid disposed in said fluid circulation system, electric heater means in said boiler for heating said diphenyl oxide fluid, electric circuit means for energizing said heater means including a cyclically operating timing switch permitting energization of said heater means only during a predetermined portion of the cyclic period of said timing switch, means for interrupting the energization of said heating means when said diphenyl oxide fluid reaches a predetermined temperature, and means for returning cold diphenyl oxide fluid from said condensate collector only when said electric heaters are energized, the heat input to said diphenyl oxide fluid during said predetermined portion of the cyclic period being proportioned to exceed the expected heat demands of said room heating means over the entire cyclic period.

6. An electrical heating system comprising a heat insulated boiler defining a fluid storing chamber, a heat dissipating, closed fluid circulation system supplied by said boiler and including a heat exchanger connected to receive hot fluid from said fluid storing chamber, a condensate collector arranged to receive cold fluid from said heat exchanger, and a pump for returning cold fluid from said condensate collector to said fluid storing chamber, room heating means energized by said heat exchanger, a fixed quantity of high boiling point, heat storing fluid disposed in said fluid circulation system, electric heater means in said boiler for heating said fluid in said fluid storing chamber, electric circuit means for energizing said heater means including a cyclically operating timing switch means permitting energization of said heater means only during a predetermined portion of the cyclic period of said timing switch means, the heat input to said fluid during said predetermined portion of the cyclic period being proportioned to exceed the expected heat demands of the room heating means over the entire cyclic period, means for energizing said pump concurrently with said electric heater means to return cold fluid from said condensate collector to said fluid storing chamber, a solenoid valve disposed between said fluid storing chamber and said heat exchanger, and means responsive to room temperature for operating said solenoid valve to control the hot fluid input to said heat exchanger.

7. An electrical heating system comprising a heat insulated boiler defining a fluid storing chamber, a heat dissipating, closed, fluid circulation system supplied by said boiler and including a heat exchanger connected to receive hot fluid from said fluid storing chamber, a condensate collector arranged to receive cold fluid from said heat exchanger, and a pump for returning cold fluid from said condensate collector to said fluid storing chamber, room heating means energized by said heat exchanger, a fixed quantity of high boiling point, heat storing fluid disposed in said fluid circulation system, electric heater means in said boiler for heating said fluid in said fluid storing chamber, means for energizing said pump concurrently with said electric heater means to return fluid from said condensate collector to said boiler, a solenoid valve disposed between said boiler and said heat exchanger, and means responsive to room temperature for operating said solenoid valve to control the hot fluid input to said heat exchanger according to the heat demands of the room area to be heated.

8. An electrical heating system comprising a heat insulated boiler defining a fluid storing chamber, a heat dissipating, closed, fluid circulation system supplied by said boiler and including a heat exchanger connected to receive hot fluid from said fluid storing chamber, a condensate collector arranged to receive cold fluid from said heat exchanger, and a pump for returning cold fluid from said condensate collector to said fluid storing chamber, room heating means energized by said heat exchanger, a fixed quantity of high boiling point, heat storing fluid disposed in said fluid circulation system, electric heater means in said boiler for heating said fluid in said fluid storing chamber, electric circuit means for energizing said heater means including a cyclically operating timing switch permitting energization of said heater means only during a predetermined portion of the cyclic period of said timing switch and means for interrupting the energization of said electric heater means when said fluid reaches a predetermined temperature, the heat input to said fluid during said predetermined portion of the cyclic period being proportioned to exceed the expected heat demands of the room heating means over the entire cyclic period, means for energizing said pump concurrently with said electric heater means to return fluid from said condensate collector to said boiler, a solenoid valve disposed between said boiler and said heat exchanger, and means responsive to room temperature for operating said solenoid valve to control the hot fluid input to said heat exchanger according to the heat demands of the room area to be heated.

9. The method of room heating by electricity which comprises electrically heating a fixed quantity of high boiling point, heat storing liquid during predetermined off peak power periods of each day, storing said heated liquid in a heat insulated enclosure, withdrawing successive portions of said heated liquid in response to room temperature, transferring the heat of the withdrawn portions to a room heating medium, collecting the cold withdrawn portions separately of the hot stored liquid, and returning the collected cold liquid portions to the remaining liquid only during the said periods of heating the heat storing liquid.

10. The method of room heating by electricity which comprises electrically heating a fixed quantity of diphenyl oxide fluid during predetermined off peak power periods of each day, storing said heated diphenyl oxide fluid in a heat insulated enclosure, withdrawing successive portions of said heated diphenyl oxide fluid in response to room temperature, transferring the heat of the withdrawn portions to a room heating medium, collecting the cold withdrawn portions of the diphenyl oxide fluid separately of the hot stored diphenyl oxide fluid, and returning the collected cold portions of the diphenyl oxide fluid to the remaining portion only during the said periods of heating the diphenyl oxide fluid.

RICHARD B. MARSHALL.

REFERENCES CITED

The following references are of record in the file of this patent:

UNITED STATES PATENTS

| Number | Name | Date |
| --- | --- | --- |
| 1,907,357 | Kovesdy | May 2, 1933 |
| 1,985,215 | Shivers | Dec. 18, 1934 |
| 2,259,401 | Tucker et al. | Oct. 14, 1941 |
| 2,266,257 | Osterheld | Dec. 16, 1941 |